(12) United States Patent
Cathomen et al.

(10) Patent No.: US 11,124,011 B2
(45) Date of Patent: Sep. 21, 2021

(54) METHOD FOR PRODUCING A SECURITY ELEMENT AND TRANSFER FILM

(71) Applicant: OVD Kinegram AG, Zug (CH)

(72) Inventors: Anja Cathomen, Morschach (CH); Marjorie Annabelle Neel, Lucerne (CH)

(73) Assignee: OVD KINEGRAM AG, Zug (CH)

( * ) Notice: Subject to any disclaimer, the term of this patent is extended or adjusted under 35 U.S.C. 154(b) by 190 days.

(21) Appl. No.: 16/061,199

(22) PCT Filed: Dec. 13, 2016

(86) PCT No.: PCT/EP2016/080825
§ 371 (c)(1),
(2) Date: Jun. 11, 2018

(87) PCT Pub. No.: WO2017/102744
PCT Pub. Date: Jun. 22, 2017

(65) Prior Publication Data
US 2019/0001735 A1    Jan. 3, 2019

(30) Foreign Application Priority Data
Dec. 15, 2015   (DE) .................... 10 2015 121 849.6

(51) Int. Cl.
*B42D 25/00*   (2014.01)
*B32B 7/00*    (2019.01)
(Continued)

(52) U.S. Cl.
CPC ............... *B42D 25/47* (2014.10); *B32B 7/12* (2013.01); *B32B 37/025* (2013.01); *B32B 37/12* (2013.01);
(Continued)

(58) Field of Classification Search
CPC ...... B42D 25/29; B42D 25/465; B42D 25/47; B42D 25/455; B32B 37/025
See application file for complete search history.

(56) References Cited

U.S. PATENT DOCUMENTS 5,006,047 A    4/1991   O'Connell
6,808,792 B1  10/2004   Weber
(Continued)

FOREIGN PATENT DOCUMENTS

CA       2745913        7/2010
CN       101160219 A    4/2008
(Continued)

OTHER PUBLICATIONS

Chinese Office Action dated Sep. 29, 2019.

*Primary Examiner* — Linda L Gray
(74) *Attorney, Agent, or Firm* — Hoffmann & Baron, LLP

(57) ABSTRACT

A method for producing a security element, wherein a base film is provided, which has a first carrier film and a single- or multilayered decorative ply,
wherein a first adhesive layer is applied to a second carrier film and a second adhesive layer is applied to the surface of the first carrier film facing away from the decorative ply or wherein the second adhesive layer is applied to the surface of the first carrier film facing away from the decorative ply and the first adhesive layer is applied to the second adhesive layer,
and wherein the second carrier film is applied to the first carrier film such that the first adhesive layer and the second adhesive layer are arranged between the first carrier film and the second carrier film.

23 Claims, 11 Drawing Sheets

(51) Int. Cl.
    *B32B 37/00*     (2006.01)
    *B42D 25/47*     (2014.01)
    *B42D 25/455*     (2014.01)
    *B42D 25/46*     (2014.01)
    *B32B 7/12*     (2006.01)
    *B32B 37/12*     (2006.01)
    *B42D 25/23*     (2014.01)
    *B42D 25/29*     (2014.01)
    *B42D 25/328*     (2014.01)
    *B42D 25/351*     (2014.01)
    *B42D 25/378*     (2014.01)

(52) U.S. Cl.
    CPC ........... B42D 25/455 (2014.10); B42D 25/46 (2014.10); *B32B 2037/1253* (2013.01); *B42D 25/23* (2014.10); *B42D 25/29* (2014.10); *B42D 25/328* (2014.10); *B42D 25/351* (2014.10); *B42D 25/378* (2014.10)

(56) References Cited

U.S. PATENT DOCUMENTS

| | | | |
|---|---|---|---|
| 7,762,590 | B2 | 7/2010 | Staub et al. |
| 2008/0094713 | A1 | 4/2008 | Tompkin et al. |
| 2009/0236034 | A1 | 9/2009 | Leroy et al. |
| 2009/0250158 | A1 | 10/2009 | Streb et al. |
| 2010/0151207 | A1 | 6/2010 | Hansen et al. |

FOREIGN PATENT DOCUMENTS

| | | | |
|---|---|---|---|
| CN | 101035686 A | | 7/2009 |
| CN | 102245394 A | | 11/2011 |
| DE | 19940790 | | 3/2001 |
| DE | 10233452 | | 2/2004 |
| DE | 10343547 | A1 | 4/2005 |
| DE | 102008062149 | | 4/2010 |
| EP | 1986869 | | 9/2009 |
| JP | H04246680 A | | 9/1992 |
| WO | WO2007048563 | | 5/2007 |
| WO | WO-2007048563 | A2 * | 5/2007 ............ B32B 38/10 |
| WO | 2010028857 | A1 | 3/2010 |

\* cited by examiner

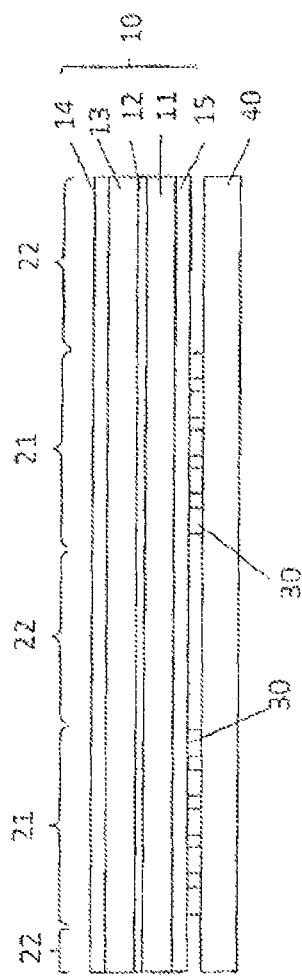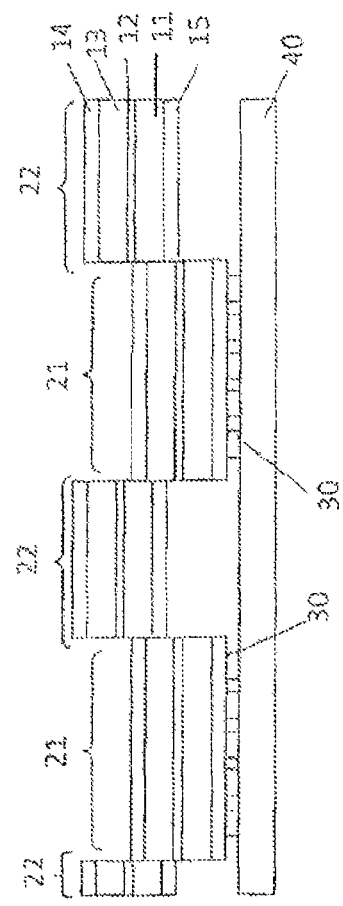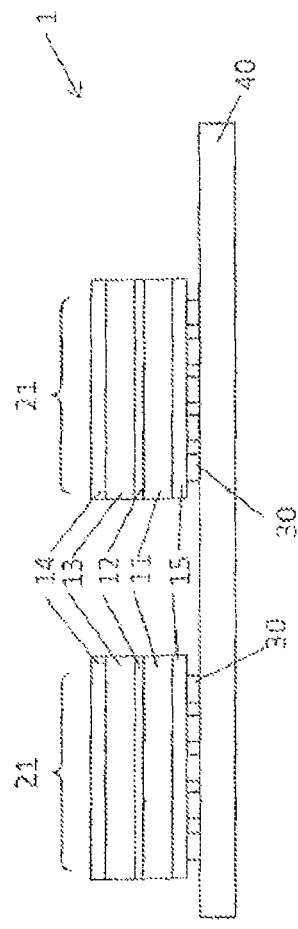
FIG. 3A
FIG. 3B
FIG. 3C

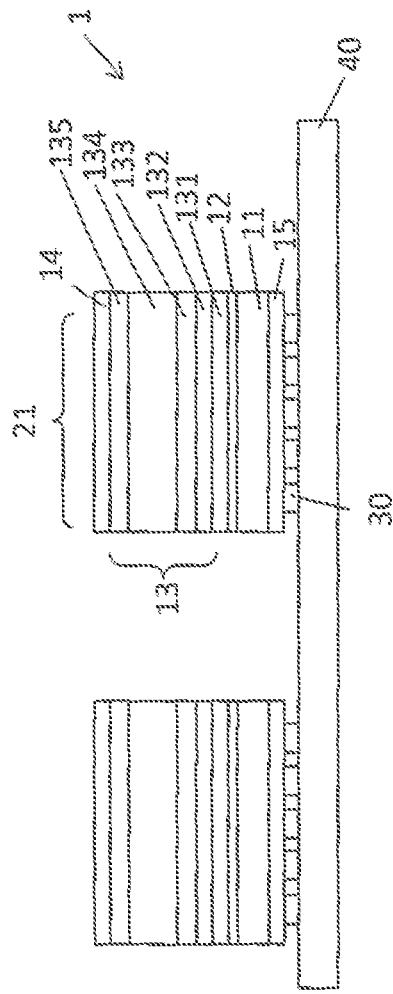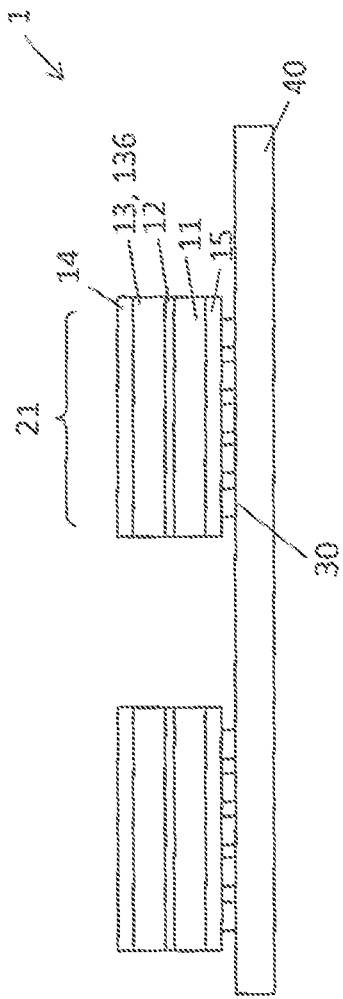

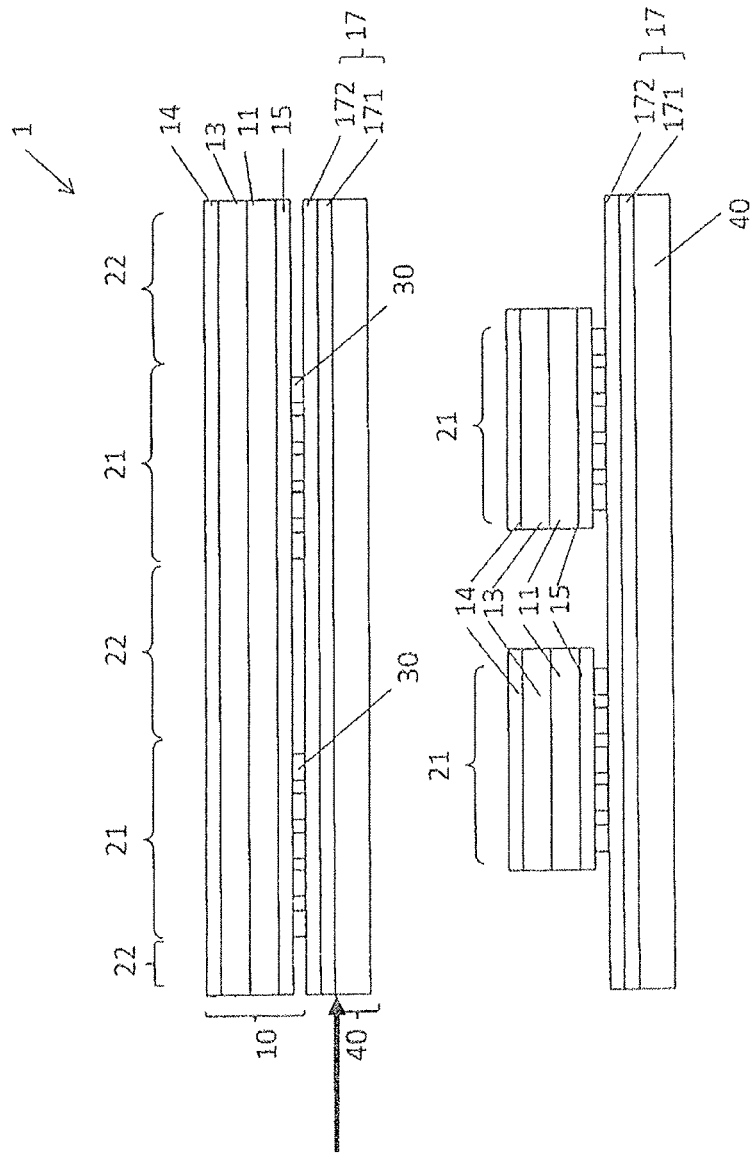

METHOD FOR PRODUCING A SECURITY ELEMENT AND TRANSFER FILM

This application claims priority based on an International Application filed under the Patent Cooperation Treaty, PCT/EP2016/080825, filed Dec. 13, 2016, which claims priority to DE102015121849.6, filed Dec. 15, 2015.

BACKGROUND OF THE INVENTION

The invention relates to a method for producing a security element, and a transfer film, in particular a hot-stamping film, for the transfer of one or more multilayer bodies onto a target substrate.

Transfer films, in particular hot-stamping films, amongst others are used for the application of a security element to security documents, for example passports, credit cards or banknotes. A security element is applied to a substrate, which is formed by the decorative ply of a hot-stamping film. The security element comprises, for example, an in particular transparent varnish layer, into which a structure, in particular for producing an optically variable effect, in particular a structure with optically diffractive action, is molded. For example, the transparent varnish layer can be further provided with a reflection-increasing layer, which is a metal layer or a dielectric layer. The security element further has an adhesive layer, by means of which the security element is fixed to the substrate. For this the hot-stamping film is placed on the substrate and, by means of a stamping die, under the action of heat and pressure, is pressed onto the cover ply in the region in which the decorative ply of the hot-stamping film is to be transferred onto the substrate. When the carrier film of the hot-stamping film is removed, this partial region of the decorative ply further adheres firmly to the substrate, and the other partial regions of the decorative ply are removed together with the carrier film.

In the case of such a transfer of the decorative ply of a hot-stamping film from a carrier film onto a substrate, the decorative ply of the stamping film is torn along the boundary line which defines the partial region of the decorative ply to be transferred. This boundary line can be defined for example by the circumferential outer edges of a stamping die as the stamping contour. In particular when transfer films with thicker layers and layers with specific properties are used, for example layers with particularly high toughness and/or brittleness, this can lead to fraying of the edges (as positive and/or negative mold).

In order to avoid these problems, it is known to adhesively bond a further carrier ply as auxiliary carrier to the carrier ply of the hot-stamping film in the region of the partial regions to be transferred and to at least partially punch through the hot-stamping film along the tear of the partial regions to be transferred (so-called patches). The partial regions not required can then be detached. The remaining partial regions can subsequently be stamped with sharp edges.

In this technology, there is the problem that the partially applied UV adhesive used therein is applied in a region that is somewhat larger than the punched patch in order to compensate for register variations in the case of UV adhesive printing, so that the complete patch is in every case covered by the UV adhesive. An adhesive border therefore exists around the patch in the punched-out state.

By register or registration and register accuracy or registration accuracy is meant a positional accuracy of two or more elements and/or layers, here in particular of the substrate and the stamping film and/or the decorative section relative to each other. The register accuracy is to vary within a predetermined tolerance, which is to be as small as possible. At the same time, the register accuracy of several elements and/or layers relative to each other is an important feature in order to increase the process reliability. The positionally accurate positioning can be effected in particular by means of sensorily, preferably optically detectable registration marks or register marks. These registration marks or register marks can either represent specific separate elements or regions or layers or themselves be part of the elements or regions or layers to be positioned.

This UV adhesive performs a double function. During the application of the film, the UV adhesive is intended to stick the auxiliary carrier and the carrier firmly together in order to guarantee the removal of the auxiliary carrier and the carrier from the applied transfer ply at the same time. During the processing/production of the film, the UV adhesive is intended to fix the partial region to be transferred in situ (for example in the case of winding procedures), but also to allow the removal of the partial regions not required; i.e. its adhesive strength, in particular at the adhesive border, should not be too great.

The UV adhesive is therefore only fully cured in part, i.e. although this adhesive is UV-cured it has a residual tack and this subsequently appears in a disruptive manner during the further application, in particular in the region of the protruding adhesive border mentioned above. The residual tack can also first be formed by the introduction of heat during the hot stamping or during other production steps, for example in the case of previously insufficient curing or generally inadequate temperature resistance of the adhesive. The mentioned residual tack can, however, also occur in the case of UV adhesives which have been largely completely cured.

Furthermore, the adhesion of the UV adhesive between auxiliary carrier and carrier during the application is not always sufficient on its own to transfer the transfer plies, and the entire patch is then transferred, including the carrier ply, which detaches from the auxiliary carrier in an undesired manner.

SUMMARY OF THE INVENTION

The object of the invention is now to specify an improved method for producing a decorative element or a security element, and an improved transfer film.

This object is achieved by a method with the features of claim 1 and a transfer film with the features of claim 46.

Such a method for producing a security element is characterized in that in the method a base film is provided, which has a first carrier film and a single- or multilayered decorative ply, wherein a first adhesive layer is applied to a second carrier film and a second adhesive layer is applied to the surface of the first carrier film facing away from the decorative ply or wherein the second adhesive layer is applied to the surface of the first carrier film facing away from the decorative ply and the first adhesive layer is applied to the second adhesive layer, and wherein the second carrier film is applied to the first carrier film such that the first adhesive layer and the second adhesive layer are arranged between the first carrier film and the second carrier film, and wherein the first adhesive layer is activated in a first region which at least partially covers at least one first partial region of the base film, but the first adhesive layer is not activated, not provided, only partially provided or deactivated in a second region adjoining this region, wherein the first carrier film is at least partially severed along the boundary line defining the at least one first partial region and separating the at least one first partial region from a second partial region of the base film, and wherein a second part of the base film comprising the second partial region is removed from the second carrier film, wherein in the at least one first partial region the base film adheres to the second carrier film because of the activated first adhesive layer and a first part of the base film comprising the at least one first partial region remains on the second carrier film.

An adhesive can be a polymer, for example a varnish as a liquid, paste-like or also powdered coating material, which is deposited thinly on surfaces and forms an in particular continuous film by chemical and/or physical processes.

A transfer film, in particular a hot-stamping film, is thus obtained for the transfer of one or more multilayer bodies onto a target substrate, wherein the transfer film has a base film, which has a first carrier film and a single- or multi-layered decorative ply, wherein the transfer film further has a second carrier film with a first adhesive layer and a second adhesive layer applied to the surface of the first carrier film facing away from the decorative ply, wherein the first adhesive layer and the second adhesive layer are arranged between the first carrier film and the second carrier film, and wherein the first adhesive layer is activated in a first region at least partially covering at least one first partial region of the base film, with the result that the base film adheres to the second carrier film in the at least one first partial region, but is not activated, not provided, only partially provided or deactivated in a second partial region adjoining the at least one first partial region, and wherein the first carrier film is severed along the boundary line defining the at least one first partial region and separating the at least one first partial region from a second partial region of the base film and a part of the base film comprising the second partial region is removed from the second carrier film.

It is hereby possible to prepare a security element which can be transferred by means of a conventional transfer method onto a security document, for example a banknote or an ID document, and which prevents a "fraying" caused by the decorative ply breaking in the edge region of the transferred multilayer body. It is further possible that the adhesive and structural properties of the decorative ply can be selected substantially independently of the requirements of the transfer process and in this way, for example, the optical properties, the resistance to environmental influences as well as the security against forgery and manipulation of the security element can be further improved. In particular, particularly brittle or thick or tough layers in the decorative ply can thus be transferred. The method according to the invention is further characterized in that the registration accuracy with which security elements can be transferred onto a target substrate is further improved.

Within the meaning of the invention, by transfer film is quite generally meant a film which has a carrier ply or carrier film and a transfer ply, wherein the transfer ply, which in particular has at least one decorative ply, can be detached from the carrier ply. The detachment is effected in particular in a stamping device, wherein at least a part of the transfer film is transferred onto a substrate to be decorated and subsequently the carrier ply is removed from the applied transfer ply.

The base film can be formed both as a transfer film and as a laminating film. If the base film is formed as a transfer film, then in particular the decorative ply of the base film is transferred onto a substrate and subsequently the first carrier film is removed from it and preferably remains on the second carrier film. Here a detachment layer is particularly preferably arranged between the decorative ply and the first carrier film.

If the base film is formed as a laminating film, then in particular the decorative ply and the first carrier film of the base film are transferred onto a substrate and subsequently the second carrier film is removed from it. Here a detachment system is particularly preferably arranged between the first and the second carrier film.

Furthermore, different shapes of the transfer film can be transferred with a uniform die shape. It is also possible to transfer several neighboring, isolated patches by means of a single die. The outer shape of the patch need not match the outer shape of the hot-stamping die. Here the hot-stamping die is preferably selected larger than the part of the base film to be transferred. For example, a patch in the shape of a star is transferred with a larger round die that more than completely covers the star. In addition to a hot-stamping die with which a hot stamping is carried out by means of stamping pressure and heat, an ultrasonic stamping die with correspondingly designed thrust bearing can also be used, with which a hot stamping is carried out by means of stamping pressure and ultrasound as an alternative form of energy. It is likewise possible to use a roll laminator, in particular a semi-rotary laminator and/or multi-roll laminator (for example for banknote applications several lamination rollers are arranged one behind another in a row). It is furthermore possible to bring the first carrier film close to the second carrier film printed with UV adhesive with the aid of a guide roller without pressing the two carrier films together. Additional, successive guide rollers then ensure the necessary contact between the two carrier films before the curing with UV light.

It is also possible that the second partial region is not coherent or also has sub-regions in which the entire composite film is removed. For example, in an embodiment each patch can have at least one enclosed free space, for example a hole in the center. The hole (in general all shapes are possible) with this shape is for example also produced during the punching procedure. The punching sheet has two punching heights, for example; one in order to sever only the decorative ply for the release of first regions and the optionally present mark region to be retained and another higher one in order to sever the entire composite film and thus to produce a hole. Lasers with different settings for kiss cutting and punching through is also possible in principle. The film fragments forming in the process are usually pressed out or blown out of the composite film. In this partial region the entire composite film is thus removed.

The advantages of such holes or perforations lie in an improvement in the interlayer adhesion when the partial region to be transferred lies between two cover layers, in particular in the later use of the security element. Furthermore, such a hole can serve as a replacement for and/or supplement to an optically transparent partial region in the motif. Through these holes or perforations the filigree character of the partial region to be transferred is enhanced and its protection against forgery is thus also improved. Possible motifs for the geometric design of the holes or perforations are alphanumeric characters such as for example A, B, D, O, R, 8, 9 6, 0.

The disadvantages of the single adhesive bonding with a UV adhesive named at the beginning can be overcome by the second adhesive layer. In particular, adhesives with different adhesive and/or activation properties can be used. The first adhesive layer merely serves to easily join the two carrier plies during processing. The second adhesive layer is preferably first thermally activated during the stamping and then increases the adhesion between the carrier plies, with the result that these can be detached together from the transferred part of the decorative ply after the stamping. In particular, this also makes it possible to apply the first adhesive layer such that it does not extend beyond the partial region to be transferred, with the result that the above-named problems due to residual tack do not arise later. The first adhesive layer is therefore preferably smaller than the partial region to be transferred. In principle the first adhesive layer fixes the partial region to be transferred in situ, wherein this can also be effected with a comparatively small adhesive spot. The latter can also be much smaller than the partial region to be transferred, with the result that the relative position between the partial region to be transferred and the first adhesive layer is not crucial.

The second carrier film can be both single-ply and multi-ply. The plies can consist of different or the same materials, for example of paper and/or fabric and/or Teslin® and/or the same or different plastic layers. They can be adhesively bonded to each other or for example produced by coextrusion or by multiple coatings.

Different adhesives, in particular differently activatable adhesives, are therefore preferably used for the first and second adhesive layer. In particular, it is advantageous to use a radiation-activatable adhesive for the first adhesive layer and a thermally activatable adhesive for the second adhesive layer. A thermally activatable adhesive can be both reactive and non-reactive. Multilayered structures are furthermore possible. In addition to radiation-activatable adhesives, other reactive types of adhesive are also possible, such as for example one- and two-component systems (epoxy systems and/or for example with isocyanates as polymerization or crosslinking initiator).

It is advantageous here if the second adhesive layer is activated when the first part of the base film is hot-stamped onto a substrate. Before the hot stamping, the second adhesive layer therefore preferably has no tack. During the hot stamping and the activation, the interlayer adhesion between the carrier plies is then increased, preferably by more than 50%, preferably more than 100%, particularly preferably more than 200%.

It is preferred if the hot stamping is effected at a temperature of from 80° C. to 300° C., preferably from 100° C. to 240° C., particularly preferably from 100° C. to 180° C. and/or with a stamping pressure of from 10 N/cm$^2$ to 10,000 N/cm$^2$, preferably from 100 N/cm$^2$ to 5000 N/cm$^2$ and/or with a stamping time of from 0.01 s to 2 s, preferably from 0.01 s to 1 s.

It is further advantageous if the second adhesive layer is dried before the second carrier film is applied to the base film. It is hereby ensured that the second adhesive layer has no tack before the hot stamping. Varying degrees of surface coverage of the second adhesive layer (for example different degrees of surface coverage in the inner or outer region in the first partial region) can also be used. It is furthermore advantageous if the second adhesive layer is applied in a grid, in particular a line grid or dot grid with a grid density of from 40 to 80 lines per cm.

It is particularly preferred if the second adhesive layer is formed from a thermoplastic adhesive with a glass transition temperature of from 50° C. to 150° C., preferably from 100° C. to 120° C. The second adhesive layer can be constructed multilayered.

It is expedient if the second adhesive layer is deposited with a weight per unit area of from 0.1 g/m$^2$ to 10 g/m$^2$, preferably from 2 g/m$^2$ to 5 g/m$^2$.

It is furthermore advantageous if the first adhesive layer is applied in a grid, in particular a line grid or dot grid with a grid density of from 40 to 80 lines per cm. Varying degrees of surface coverage of the first adhesive layer (for example different degrees of surface coverage in the inner or outer region in the first partial region) can also be used.

It is expedient if the first adhesive layer is deposited in the region of the printed grid with a layer thickness of from 0.01 µm to 10 µm, preferably from 2 µm to 5 µm.

By the only partial application of the first adhesive layer it is ensured that the second adhesive layer is in direct contact with both transfer plies and in this way can increase the adhesion in the desired manner.

The base film preferably has a detachment layer arranged between the first carrier film and the decorative ply. It is further also possible that the material and the surface finish of the first carrier film and of the layer of the decorative ply facing the first carrier film are selected such that the decorative ply can be detached from the first carrier film. It is hereby made possible that a partial region of a film body, which only comprises a partial region of the decorative ply and—optionally—an adhesive layer and does not also comprise the associated partial region of the first carrier film, can be applied to a target substrate by means of the transfer film according to the invention. This is advantageous in particular if thin and mechanical layer plies that are unstable per se are to be transferred onto the target substrate.

According to a further preferred embodiment, no detachment layer is contained between the first carrier film and the decorative ply. According to this embodiment, the first adhesive layer and a second adhesive layer arranged between the decorative ply and the target substrate are selected such that the adhesive strength produced by the activated first adhesive layer between the first carrier film and the second carrier film is lower than the adhesive strength produced between the decorative ply and the target substrate by the activated second adhesive layer. It is hereby possible, after the second adhesive layer has been activated, to remove the second carrier film from the first partial region of the base film and thus to apply the entire first partial region of the base film, i.e. decorative ply and first carrier layer to the target substrate by means of a transfer process. By means of the method according to the invention it is thus possible to transfer mechanically stable film bodies onto a target substrate. The stability achieved hereby during the transfer also allows the transfer of regions in which contain additional auxiliary punches as predetermined breaking points. Here it is further also possible to transfer these film bodies onto a banknote not only in the form of a strip, but in any desired shape, for example as a patch.

It can furthermore be provided that a detachment system is provided between the first carrier film and the second carrier film. The detachment system can be applied both to the first carrier film and to the second carrier film. The adhesive layers here are preferably arranged either between the second carrier film and the detachment system or between the first carrier film and the detachment system.

During application to a target substrate, the detachment system, together with the decorative ply and the first carrier film, can be applied to the target substrate completely or only partially, preferably only individual layers of the detachment system. However, it is also possible that the detachment system remains on the second carrier film during application of the film to a target substrate and after application is removed from the target substrate together with the second carrier film.

This makes it possible for the first carrier film to remain on the multilayer body or in the layer composite thereof during the application of at least one first partial region or of a multilayer body. A self-supporting security element is hereby produced, which can seal or cover for example apertures, in particular window openings, in the target substrate. The additional mechanical stability which the first carrier film gives the multilayer body or a security element can furthermore serve to increase the optical brilliance of the security element when the security element is for example laminated into a plastic composite, as can be the case for example with security documents made of polycarbonate (PC) in an ID card format or other laminates. This additional mechanical stability can also be advantageous in the further processing of the target substrate, for example in the case of overprinting with die stamping.

The detachment system preferably consists of a wax-like material which softens in particular due to the heat arising during a hot-stamping procedure. The overall thickness of the detachment system is preferably between 0.01 μm and 4 μm. is softened and makes a reliable separation of the second carrier film possible.

The detachment system can be constructed multilayered. It comprises for example a layer made of wax and a layer made of a varnish. Acrylates, polyurethanes or cellulose derivatives can be used as varnishes. The varnish layer preferably has a thickness in the range of from 0.1 to 3 μm, preferably in the range of from 0.2 to 1.5 μm.

The layers of the detachment system on the multilayer body or on the security element preferably have substantially the same area size as the security element or as the first partial regions after application to the target substrate. This is made possible in particular in that during the application the detachment system is only activated inside the first partial region and is not activated in the neighboring second partial region, and therefore the detachment layer system remains on the second carrier film in the second partial region. The small thickness of the detachment system makes possible a sharp-edged separation of the detachment layer system at the outer edges of the first partial region.

One or more layers of the detachment system preferably remain on the security element after application to the target substrate. This is preferably the case when the detachment system is arranged between the second carrier film and the adhesive layers. It is hereby possible with the aid of these layers to provide the outer surface of the multilayer body or security element with additional functions. Examples are a better wettability or overprintability with further functional layers or, conversely, a hydrophobic function or functions to repel other liquids or also the generation of optical matting and/or of an optical gloss and/or the generation of particular tactile properties. It is also possible to add additional security prints in the visible wavelength range, UV range or IR range. Individual or all layers of the detachment layer system can be provided over the whole surface or only in partial surface regions.

It is furthermore possible that one or more auxiliary layers are applied to the side of the first carrier film of the base film facing away from the decorative ply before the detachment system is applied. The auxiliary layers are therefore then arranged between the first carrier film and the detachment system. It is hereby possible with the aid of these auxiliary layers to provide the outer surface of the security element or of the multilayer body with additional functions. Examples are better wettability or overprintability with further functional layers or, conversely, a hydrophobic function or functions to repel other liquids or also the generation of optical matting and/or of an optical gloss and/or the generation of particular tactile properties. It is also possible to add additional security prints in the visible wavelength range, UV range or IR range. A further function can consist of increasing the adhesive bond with further cover plies when the target substrate is laminated into a document or a document composite. Individual or all layers of the detachment layer system can be provided over the whole surface or only in partial surface regions.

The one or more layers of the detachment system are preferably detached from the security element after application to the target substrate and the auxiliary layers form the outer, free surface of the security element. If the auxiliary layers are dispensed with, the carrier film preferably forms the outer, free surface of the security element and thus in particular enables a particularly brilliant optical effect of the security element.

It is particularly advantageous here to transfer the film body onto a window of a security document, for example of a banknote or of an ID document, and with it to completely or partially seal or cover the window. Security elements with see-through properties, with different images when looked at from above and when looked through, with different images when viewed from the front and rear side of the substrate or with Moiré images can hereby be used. Combinations of various optical effects are also possible. Transparent or semi-transparent regions of a substrate and/or substrates with one or more holes or with one or more apertures are intended to come under the generic term window.

It is thus possible to select the shape of the film bodies in terms of their longitudinal extent to be smaller, and thus to minimize the deformation of the security document due to the paper and the film having different extents because of the smaller sealed surface area. The part of the security element covering the region of the window can comprise parts of the second adhesive layer or no adhesive, be coated with a varnish over part or all of the surface or be printed over part or all of the surface.

In order to minimize even further the deformation of the security document due to the paper and the film having different extents, it is furthermore advantageous to apply to the side of the target substrate opposite the film body a sealing layer, which preferably has a similar or the same areal extent as the film body and is arranged largely overlapping the film body, with the result that the target substrate is covered by the film body and the sealing layer equally on both sides. The thickness or strength of the sealing layer can be the same as the thickness or strength of the film body or different therefrom. The external outline of the film bodies on the opposite sides of the target substrate can be different. The sealing layer can be formed by a sealing film body or by a sealing varnish layer. The sealing layer is intended above all to seal the regions of the target substrate surrounding the window, but it can also be provided in the region of the window. For example, the sealing layer can be either applied before the window is introduced, for example by punching or cutting, and severed and removed together with the target substrate when the window is introduced. An alternative variant is to apply the sealing layer after the window has been introduced, with the result that the sealing layer also covers the free rear side of the film body in the region of the window. The sealing layer can likewise seal in particular the perpendicular cut edges of the window in order there too to prevent the ingress of moisture.

The sealing layer can in particular have the same structure as the security element. The sealing layer can be produced and/or applied in the same way as the security element.

The sealing layer, like the film body, can have security elements which can be overlaid with security elements of the film body, with the result that several security elements in combination can in particular produce optical effects.

It is further also possible to provide a further security feature through the design of the outline of the transferred film body. For example, the outline can have filigree motifs and/or detailed motifs. The outline of the transferred film body can be similar to the outline of the window or different therefrom.

According to a preferred embodiment, an adhesive layer that can be activated by electromagnetic radiation, in particular an adhesive layer consisting of a UV-activatable adhesive which can be activated by irradiation with UV light, is used as first adhesive layer. Other possible forms of irradiation are by means of an electron beam or laser radiation. On the one hand this achieves the advantage that the activation of the first adhesive layer in the first region can be controlled with pinpoint accuracy. It has further been shown that, when such an adhesive layer is used, a detachment of the first carrier film from the second carrier film during a subsequent transfer process can be reliably prevented and thus the transfer result can also be further improved.

The first adhesive layer is preferably applied to the surface of the carrier film facing away from the decorative layer over the whole surface both in the at least one first partial region and in the second partial region. The activation of the first adhesive layer in the first region is here then effected subsequently before the second part of the base film is removed. The first adhesive layer can be applied to the first carrier film here for example by means of a printing process, for example flexographic printing, gravure printing or screen printing, but also by means of pouring, spraying or coating using a doctor blade. It is possible to apply the adhesive in particular from a solution, for example based on organic solvents or on aqueous basis, as a dispersion or as an emulsion, or without a solvent (100% system).

The first adhesive layer is preferably activated by irradiation in the first region after the second carrier film has been applied, with the result that the second carrier film adheres to the base film in the first region, i.e. to the second adhesive layer on the first carrier film of the base film. The material of the first adhesive layer is here preferably selected in relation to the base film and the second carrier film such that the adhesion between the base film and the second carrier film after activation of the first adhesive layer is higher than the adhesion imparted by the detachment layer between the decorative ply and the first carrier film, even at room temperature (20° C.). The material of the first adhesive layer and second adhesive layer is further preferably selected in relation to the first carrier film and the second carrier film such that the adhesion between the first carrier film and the second carrier film in the case of an non-activated first adhesive layer is lower than the adhesion imparted by the detachment layer between the first carrier film and the decorative ply, both at room temperature (20° C.) and at the stamping temperature (180° C.).

It has further proved to be advantageous that the adhesion properties between the first adhesive layer and/or the second adhesive layer and the first and/or second carrier film are adapted by applying primers (for example varnishes; vapor-deposition of chromium and/or $SiO_x$), adhesion promoters or by corona, flame or plasma treatment of the first and, respectively, second carrier film.

According to a preferred embodiment example, the first adhesive layer is irradiated by a radiation source arranged at a distance in the direction of the side of the second carrier film facing away from the decorative layer. The radiation source is here preferably arranged at a distance of more than 10 mm from the second carrier film. A UV radiation source which exposes the first adhesive layer to light, preferably to UV light, is preferably used as radiation source. For example UV lamps are thus suitable as radiation source, in particular with a downstream collimator or also a laser. Through such an exposure of the first adhesive layer it is possible to select the exposure of the first adhesive layer independently of the design of the decorative ply of the base film. The second carrier film here preferably consists of a material which is at least partially transparent for a particular wavelength range of the radiation source used for the exposure.

A UV exposure system consists for example of a radiation source which can be used depending on the power and type (for example mercury vapor lamps with/without doping or also UV LEDs) as well as of diaphragms and/or reflectors (for example for a collimating or focusing beam path with or without filters for, for example, IR radiation). UV LEDs, i.e. light-emitting diodes which emit UV radiation, can be used particularly advantageously due to their comparatively low thermal radiation compared with mercury vapor lamps and the associated low power loss as well as the associated low thermal loading of the substrate and/or of the films to be processed.

A selective exposure of the first adhesive layer in the desired regions, for example the selective irradiation of the first adhesive layer in the first region for the activation of the first adhesive layer in the first region, can be achieved by a corresponding actuation of the radiation source or by arranging an exposure mask in the beam path between the radiation source and the first adhesive layer.

It is further also possible to deactivate the first adhesive layer by exposure in the second region. For example, it is thus possible to use a corresponding adhesive for the first adhesive layer, which can be deactivated for example by means of UV radiation. It is further also possible to use a UV-activatable adhesive for the first adhesive layer, which cures when irradiated with UV light, and to irradiate the first adhesive layer before the second carrier film is applied in the second region. The first adhesive layer is thus cured before application of the second carrier film in the second region, with the result that an adhesion of the second carrier film in the second region no longer possible after the second carrier film has been applied as the first adhesive layer has already been cured and thus deactivated in this region.

According to a preferred embodiment, a laser is used as radiation source, which is controlled such that the first adhesive layer is irradiated in the first region, but not in the second region, and/or is irradiated in the second region, but not in the first region. This can be achieved for example by corresponding control of a control element that determines the position of the laser or the deflection angle of the laser beam.

According to a further preferred embodiment example, an exposure mask is arranged in the beam path between the radiation source and the first adhesive layer, which is formed and arranged such that the first adhesive layer is irradiated in the first region, but not in the second region, or the first adhesive layer is irradiated in the second region, but not in the first region. The exposure mask here can be for example part of a drum or flatbed imagesetter, by which the film web is formed, is guided from the second carrier film, first adhesive layer, second carrier film, detachment layer and decorative ply.

According to a further preferred embodiment example, the decorative layer is used to control the irradiation of the first adhesive layer.

For this the first adhesive layer is preferably irradiated by a radiation source arranged in the direction of the side of the decorative layer facing away from the first carrier film and arranged at a distance from the decorative layer. The first decorative layer is thus arranged in the beam path between the radiation source and the first adhesive layer. The decorative layer preferably has an opaque layer provided in the first or second region and not provided in the second or the first region respectively, which is used as a masking layer to control the irradiation of the first adhesive layer. It is thus possible for example additionally to use a metallic reflective layer of the decorative layer as a masking layer to control the irradiation of the first adhesive layer. It is hereby possible to control the exposure of the first adhesive layer register-accurate in relation to the design of the decorative layer.

In a first irradiation step the first adhesive layer is preferably irradiated, before the second carrier film is applied, by a radiation source arranged in the direction of the side of the decorative layer facing away from the first carrier film and arranged at a distance from the decorative layer, through the decorative layer acting as masking layer and is deactivated in the second region. In a second irradiation step the first adhesive layer is then irradiated, after the second carrier film has been applied, by a radiation source arranged in the direction of the side of the second carrier film facing away from the first carrier film and arranged at a distance from the second carrier film and is activated in the first region.

UV-A and/or UV-B and/or UV-C rays can be used for the curing, depending on the initiator system used in the adhesive layer and/or depending on the radiation permeability of the carrier films and/or other layers to be irradiated. Furthermore a sufficient input of energy is necessary in order to achieve an adequate curing. Heat (for example IR radiation) additionally supports this curing. By curing is meant in particular a chain-linking of short-chain monomers, oligomers and polymers to form longer-chain polymers. The polymer chains are in principle more mobile when heat is introduced and can thereby chain to one another more easily.

The exposure of the first adhesive layer can—as described above—be effected in one step. However, it is also possible that the exposure is effected in several steps. It is thus possible for example that although the adhesive layer is activated in a first exposure step, a complete curing of the adhesive is not yet effected. After the second part of the base film has been removed, the remaining film with the second carrier film and the first part of the base film is then post-irradiated, wherein the first adhesive layer cures completely. In the case of opaque transfer films, in particular a pre-activation of the UV adhesive can also be effected from the adhesive side. The plies are then brought together and the pre-activated adhesive is then post-cured through the plies.

According to a further preferred embodiment, the decorative ply and/or one of the transfer plies has marks, which can be used to determine the first and second region of the first adhesive layer and/or to determine the first and second partial regions of the base film. These marks thus represent register marks. The marks can be formed from a printing material and/or from a surface relief and/or from a magnetic and/or an electrically conductive material. The marks can be thus for example be optically readable register marks which differ from the background by their color value, their opacity or their reflective properties. The marks can also be a macroscopic or diffractive relief structure which deflects the incident light in a predetermined angle range and differ optically from the background region through these properties. Design elements of the decorative ply can also serve as position marks. The register marks can, however, also be register marks that are detectable by means of a magnetic sensor or a sensor detecting the electrical conductivity. Punched holes as marks are also possible as is the bringing together of the films by means of pre-punched "tractor tracks".

The marks are detected, for example by means of an optical or mechanical, inductive, capacitive sensor or ultrasound sensor, and the severing of the carrier film, the activation of the first adhesive layer, the deactivation of the first adhesive layer and/or the application of the first adhesive layer is then controlled by means of the marks. The decorative ply thus has for example optically readable register marks, which controls the irradiation of the first adhesive layer and preferably also the severing of the first carrier layer along the boundary line between the at least one first partial region and the second partial region. Both a register-accurate activation of the first adhesive layer and a register-accurate severing of the carrier film in relation to the design of the decorative ply is hereby also possible.

The marks are preferably arranged in the second partial region of the base film. However, the marks need not always be located only in the second partial region. Alternatively at least some of the marks, usually designed as a continuous track, can be fixed to the carrier film and exposed. These marks are read during the application and required for the indentation during the positioning (insetting). These marks thus form a separate partial region, which is not removed with the second partial region and is also not applied together with the first partial region. Here the marks can be formed for example as lines or strips, which preferably run transversely and longitudinally (for the longitudinal and/or transverse register control) to the longitudinal direction of the film web which forms the base film. Here the marks are preferably arranged between two first regions of the base film.

Furthermore, one or more register marks are preferably allocated to each first part of the base film.

It is further also advantageous if the first adhesive layer is deactivated in the second region by means of overprinting with a deactivation layer or the first adhesive layer is printed onto the first and/or second carrier film in the first region, but not in the second region. The deactivation layer can be, for example, made of silicone or silicone-containing materials or of polytetrafluoroethylene (PTFE)/(Teflon®).

It is further also possible that the first adhesive layer is applied with a different area density in the first region and in the second region, with the result that the average adhesive strength per unit area, in particular per $cm^2$, differs in the first and second regions. In this embodiment, the first adhesive layer is preferably printed on in a pattern such as dots, symbols, alphanumeric characters, lines, circles, waves or other graphic motifs in the first and/or second surface region, wherein the difference in the area density can be achieved by variation of the dot sizes and/or of the grid widths between the adhesive spots. It is further also possible for this purpose to apply the adhesive layer over the whole surface in the first region and to apply the adhesive layer only in the form of a dot grid in the second region or not to apply the first adhesive layer in the second region and to apply the adhesive layer in a dot grid in the first region. The average surface coverage of the first and/or second carrier film with the first adhesive layer in the first region differs from that in the second region here by at least 15%. These methods make it possible to achieve the advantages of the invention cost-effectively by means of a printing process, for example by means of gravure or flexographic printing.

The second carrier film is preferably coated onto the base film by means of two opposing rollers.

According to a preferred embodiment example, the decorative ply, the detachment layer and the first carrier film are completely severed along the boundary line defining the at least one first partial region. Here it is also possible that the second carrier film is also partially severed. Here, however, care is preferably to be taken that the second carrier film is less than 50%, preferably less than 10%, severed. If the film has a detachment system, this can then also be completely severed along the boundary line defining the at least one first partial region.

The first carrier film is preferably severed by means of punching, for example by means of a rotary die cutter or by means of a laser.

The first carrier film is preferably severed registered relative to the boundary line between the first and second regions. The method according to the invention on the other hand does not require a high register accuracy between the process that structures the first adhesive layer (exposure, printing, stamping) and the severing process (punching), with the result that cost-effective, large-scale industrial processes can be used.

It is further advantageous that the film body formed by the base film, the second carrier film and the first adhesive layer is processed by means of a hot-stamping die, which at the same time activates the first adhesive layer in the first partial region and at least partially punches through the first carrier film along the boundary line defining the at least one first partial region. A very high register accuracy between these two processes is hereby achieved and furthermore the number of processing steps is reduced.

According to a preferred embodiment example, after the second part of the base film has been removed, the remaining film with the second carrier film and the first part of the base film is used as transfer film, in particular hot-stamping film, for the security of security documents. This transfer film provides a security element for the security of security documents.

It is further possible that this transfer film has a plurality of first partial regions, which each comprise a security element for the security of a security document, which is used for the security of this security document by means of transfer onto a security document.

After the second part of the base film has been removed, for this purpose the remaining film with the second carrier film and the first part of the base film is placed on a target substrate, one or more first partial regions of the base film are applied to the target substrate by activation of an adhesive layer arranged between the decorative ply and the target substrate, and the multilayer body comprising the first carrier film, the first and second adhesive layers and the second carrier film is removed from the decorative ply of the applied one or more first partial regions of the base film.

After the second part of the base film has been removed, it is furthermore also possible that the remaining film with the second carrier film and the first part of the base film is placed on a target substrate, one or more first partial regions of the base film are applied to the target substrate by activation of an adhesive layer arranged between the decorative ply and the target substrate, and the second carrier film is removed from the decorative ply and the first carrier film of the applied one or more first partial regions of the base film. If the film has a detachment system, the detachment system can then either remain on the second carrier film or be applied together with the applied first partial region of the base film.

For this, preferably a third adhesive layer, which is preferably a heat-sealable adhesive layer, is applied to the side of the decorative ply facing away from the first carrier film. It is further also possible that the third adhesive layer is a pressure-sensitive, cold-setting or latent-reactive heat-sealable adhesive layer.

A transparent plastic film of a thickness of more than 6 μm, preferably of a thickness between 6 μm and 250 μm, is preferably used as second carrier film. However, it is also possible to use a paper substrate or Teslin® (matte, white, uncoated single-ply polyethylene film) as second carrier film. A plastic film of a thickness between 4 μm and 75 μm is preferably used as first carrier film.

According to a preferred embodiment example, two or more first partial regions are provided and each of the first partial regions is surrounded by the second partial region formed as a coherent region. This facilitates removal of the second region of the base film. Alternatively the second partial region can, however, also comprise several non-coherent areas.

The first region preferably covers at least 50% of each first partial region, further preferably more than 70% of each first partial region. It is further also possible that the first region completely covers each first partial region. The second partial region further covers the first region preferably by less than 5%. This measure further ensures that the second part of the base film can be removed with high reliability.

According to a preferred embodiment example of the invention, the decorative ply has one or more layers generating an optically variable effect. The decorative ply thus preferably has a replication varnish layer with a surface structure molded into the replication varnish layer, for example a diffractive surface structure, a microlens structure, a matte structure or a symmetrical or asymmetrical blazed grating. A microlens structure can for example include spherical lenses or cylindrical lenses. Examples of such security elements with a microlens structure are so-called Moiré magnifiers.

The decorative ply further preferably has a reflective layer, which is further preferably formed patterned in the form of a first item of information. The reflective layer is preferably a metal layer made of chromium, copper, silver or gold or an alloy of such metals, which is preferably vapor-deposited under vacuum, in particular preferably in a layer thickness of from 0.01 μm to 0.10 μm. It is further also possible that the reflective layer is formed by a transparent reflective layer, for example a thin or finely structured metallic layer or an HRI (high refractive index) or LRI (low refractive index) layer. Such a dielectric reflective layer consists, for example, of a vapor-deposited layer made of a metal oxide, metal sulfide, titanium dioxide, etc. The layer thickness is preferably between 10 nm and 150 nm.

The decorative ply further preferably has a volume hologram layer into which a volume hologram is inscribed. In contrast to surface holograms with a surface structure, volume holograms are based on light diffraction at so-called Bragg planes inside a transparent layer, by which local differences in refractive index are formed inside this transparent layer.

The decorative ply further preferably has a thin-film layer element for generating a color shift effect dependent on the viewing angle. Such a thin-film layer element comprises, for example, an absorption layer, a spacer layer and a reflective layer, wherein the spacer layer has a layer thickness in the region λ/2 or λ/4 of a wavelength λ of light in the visible frequency range. It is further also possible that such a thin-film layer element comprises a sequence of several layers of different refractive index, which each satisfy the λ/2 or λ/4 condition.

The decorative ply preferably has a color layer formed patterned in the form of a second item of information. The color layer is preferably one or more individual color layers containing pigments and/or dyes and/or a color layer containing optically variable pigments, for example thin-film layer pigments or liquid crystal pigments. The use of UV- or IR-luminescent or -phosphorescent pigments is also possible. The color layer or several color layers can be applied, for example, with the aid of an inkjet printing process and in particular as an individualized item of information.

The decorative ply can further also have a liquid crystal layer, preferably a cholesteric liquid crystal layer or a nematic liquid crystal layer or a combination of cholesteric and/or nematic liquid crystal layers. The decorative ply can further also have two or more color layers, print promoter layers for inkjet printing or any desired combination of the above-mentioned layers. Further functional layers and combinations with these are likewise possible.

It is further also possible that the decorative ply comprises one or more electrically conductive or semiconductor layers, which preferably represent an electrical circuit or an electrical component, for example an RF resonant circuit or an RFID tag and/or conductor paths and/or antennae and/or electrically conductive codes. It is advantageously a metallic layer, which is vapor-deposited or printed on and then preferably reinforced by galvanic growth.

BRIEF DESCRIPTION OF THE DRAWINGS

In the following the invention is explained by way of example with reference to several embodiment examples utilizing the attached drawings. There are shown in:

FIGS. 2 and 3 schematic sectional representations to illustrate the method steps in the production of a transfer film.

FIGS. 5 and 6 schematic sectional representations of transfer films with alternative decorative plies.

FIG. 7A a schematic sectional representation of a further transfer film

FIG. 7B a schematic sectional representation of the transfer film according to FIG. 7a in the punched-out state FIG. 8 a schematic sectional representation to illustrate the production of a further transfer film FIG. 9 schematic sectional representations to illustrate the method steps in the transfer of a further transfer film FIG. 10A a schematic sectional representation of a further transfer film FIG. 10B a schematic sectional representation of the transfer film according to FIG. 10a in the punched-out state FIG. 11 a schematic sectional representation to illustrate the production of a further transfer film FIG. 12 schematic sectional representations to illustrate the method steps in the transfer of a further transfer film

DETAILED DESCRIPTION

Figures 1A, 1B:
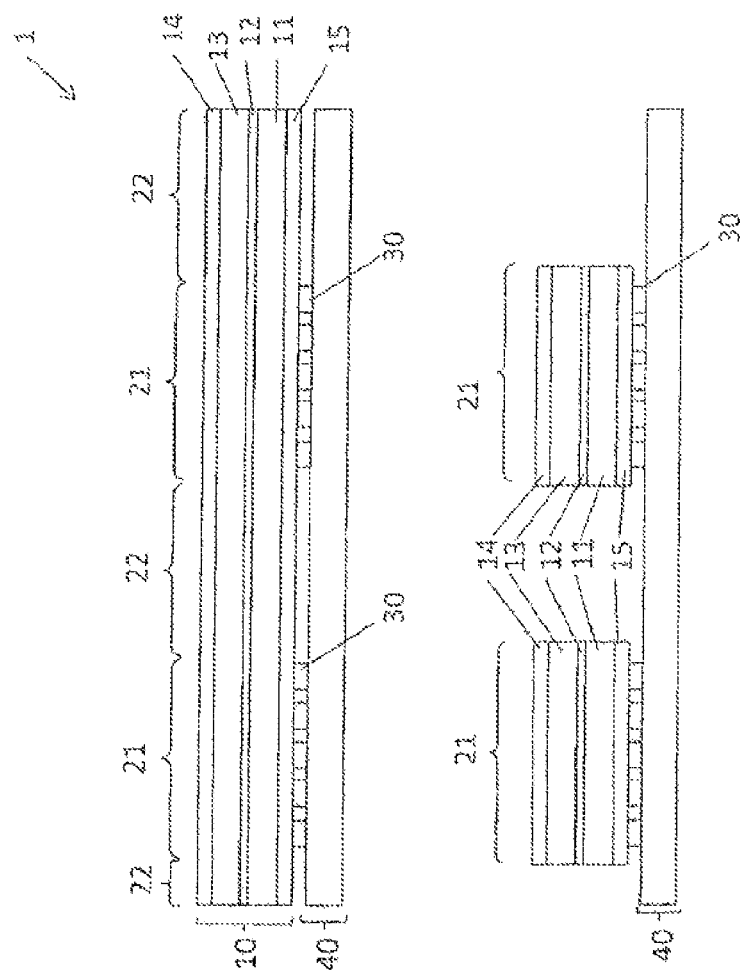
FIG. 1A a schematic sectional representation of a transfer film.
FIG. 1B a schematic sectional representation of the transfer film according to FIG. 1a in the punched-out state.

FIG. 1A shows a transfer film 1 with a base film 10 and a further carrier film 40. The base film 10 comprises a carrier film 11, a detachment layer 12 and a decorative ply 13, which can comprise a protective varnish layer, a replication varnish layer, a reflective layer and an adhesive layer 14.

A reinforcing layer with a layer thickness of from approx. 0.1 μm to 5 μm, preferably from 1 μm to 3 μm can be provided between the replication varnish layer and the protective varnish layer for the additional mechanical stabilization in the case of a lamination, for example in a plastic card structure.

A primer layer with a layer thickness of from approx. 0.01 μm to 0.5 μm, preferably from approx. 0.03 μm to 0.1 μm and/or a further reinforcing layer with a layer thickness of from approx. 0.1 μm to 10 μm, preferably from approx. 0.5 μm to 5 μm can also be provided between the reflective layer and the third adhesive layer (for binding to the substrate) for the additional mechanical stabilization in the case of a lamination, for example in a plastic card structure.

These above-named reinforcing layers can also be constructed multilayered.

The carrier film 11 is preferably a PET, PEN or BOPP film with a thickness of from 6 μm to 125 μm. The detachment layer and the decorative ply are now constructed on the carrier film 11 successively, by applying further layers. For this, first the detachment layer 12 is applied to the carrier film 11. The detachment layer 12 preferably consists of a wax-like material which is softened in particular due to the heat arising during a hot-stamping procedure and makes a reliable separation of the decorative ply from the carrier film 11 possible. The detachment layer can be constructed multilayered (for example from a layer of wax and then a layer of release varnish). The overall thickness of the detachment layer is preferably between 0.01 μm and 1.2 μm. The protective varnish layer is then applied in a layer thickness between 0.5 μm and 1.5 μm. Here it is also possible that the protective varnish layer takes on the function of the detachment layer 12 and therefore both makes it possible to separate the decorative ply 13 from the carrier film 11 and protects the decorative ply 13 against mechanical influences and environmental influences. Here it is also possible that the protective varnish layer 13 is colored or contains micro- and nanoparticles.

The replication varnish layer consists of a thermoplastic varnish into which a surface structure is molded by means of heat and pressure by the action of a stamping tool. It is further also possible that the replication varnish layer is formed by a UV-crosslinkable varnish and the surface structure is molded into the replication varnish layer by means of UV replication.

The replication varnish layer preferably has a layer thickness between 0.5 μm and 15 μm. The surface structure molded into the replication varnish layer is preferably a diffractive surface structure, for example a hologram, Kinegram® or another grating structure with optically diffractive action. Such surface structures typically have a spacing of the structural elements in the range of from 0.1 μm to 4 μm.

It is further also possible that the surface structure is a macroscopic surface structure, for example a microlens array or a blazed grating.

After the surface relief has been molded, the reflective layer is applied to the replication varnish layer. The reflective layer is preferably a metal layer made of chromium, copper, silver or gold or an alloy of such metals, which is vapor-deposited under vacuum in a layer thickness of from 0.01 μm to 0.10 μm. It is further also possible that the reflective layer 16 is formed by a transparent reflective layer, for example a thin or finely structured metallic layer or an HRI (high refractive index) or LRI (low refractive index) layer. Such a dielectric reflective layer consists, for example, of a vapor-deposited layer made of a metal oxide, metal sulfide, titanium dioxide, etc. with a thickness of from 10 nm to 150 nm.

It is further also possible to introduce still further layers instead of or in addition to the named layers in the decorative ply 13, which generate an optically variable effect, for example a volume hologram layer, a thin-film layer system, a layer of a crosslinked cholesteric liquid crystal material or a color layer. It is further also possible that the decorative ply comprises one or more electrically conductive or semiconductor layers, which realize an electrical circuit or an electrical component, for example an RF resonant circuit or an RFID tag. This can be for example a metallic layer, which is either vapor-deposited or printed on and then reinforced by galvanic growth. In particular the reflective layer 16 can at the same time serve as an electrically conductive layer, which can also be subsequently galvanically reinforced for this purpose. The decorative layer 13 can further comprise one or more layers of a magnetic material or an electroluminescent material.

The adhesive layer 14, which can be constructed multi-layered and/or on aqueous or solvent-containing basis and/or radiation-curing or combinations thereof, is then applied in an overall layer thickness of from approximately 0.3 μm to 25 μm. The adhesive layer 14 preferably consists of a thermally activatable adhesive and is applied to the layer 13 over the whole surface, for example by means of a doctor blade.

An adhesive layer 15 is applied to the side of the carrier ply 11 facing away from the decorative ply 13, which adhesive layer preferably also consists of a thermally activatable adhesive and is deposited over the whole surface.

As indicated in FIG. 1A and FIG. 1B, the base film 10 and thus also the decorative ply 13 has two first partial regions 21 and one second partial region 22 surrounding the first partial regions 21. The first partial regions here represent the part of the decorative ply which is to be transferred as a security element onto a target substrate, for example a security document.

The relief structure molded into the replication varnish layer is preferably selected such that it generates a predetermined optically variable item of information in the first partial regions 21. The surface structure molded in the first partial regions 21 thus preferably differs from the surface structure molded into the replication varnish layer in the partial region 22. The reflective layer is further preferably patterned and partially provided and provides a second predefined item of information in the first partial regions 21. The patterned design of the reflective layer in the first partial regions 21 thus preferably also differs from that in the second partial region 22. The reflective layer is preferably not provided in the second partial region 22. The optional further optically active layers of the decorative ply 13 are also preferably formed registered relative to the partial regions 21 and provide further items of information in the partial regions 21, with the result that the formation of this layer in the first partial regions 21 likewise differs from that in the second partial region 22.

It is further also possible that a plurality of first partial regions 21 is provided, which are surrounded by a continuous second partial region 22 surrounding the first partial regions 21.

A first adhesive layer 30 is applied to the further carrier film 40. The adhesive layer 30 here is applied only in the region of the first partial regions 21 and preferably in a grid.

The adhesive layer 30 is a UV-activatable adhesive. The adhesive which can be used for the adhesive layer 30 has the following composition, for example:
Dicyclopentyloxyethyl methacrylate 50% to 60%
2-Hydroxyethyl methacrylate 8%
Trimethylolpropane triacrylate 40% to 30%
(3-(2,3-Epoxypropoxy) propyl)trimethoxysilane 1%
1-Hydroxy-cyclohexyl-phenyl-ketone (Irgacure 184 (BASF)) 1% to 2%

By way of example, a different composition adhesive which can be used for the adhesive layer 30 is, for example:
Dicyclopentyloxyethyl methacrylate 50% to 55%
2-Hydroxyethyl methacrylate 8%
Trimethylolpropane triacrylate 35% to 30%
Phenol, ethoxylated, esters with acrylic acid 5%
Dipropylene glycol diacrylate 5%
(3-(2,3-Epoxypropoxy) propyl)trimethoxysilane 1%
1-Hydroxy-cyclohexyl-phenyl-ketone (Irgacure 184 (BASF)) 1% to 2%

The adhesive layer 30 is applied to the carrier film 40 in a layer thickness of from 0.1 μm to 10 μm by means of a printing process, by means of pouring or by means of a doctor blade.

The carrier film 40 is a transparent plastic film, which preferably consists of PET, PVC, PEN or BOPP film and has a layer thickness of from 6 μm to 250 μm.

Figure 2A:
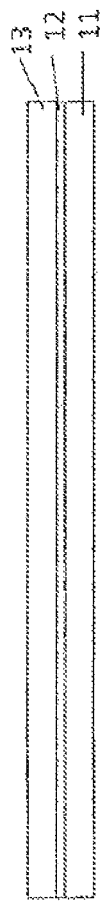
Figure 2B:
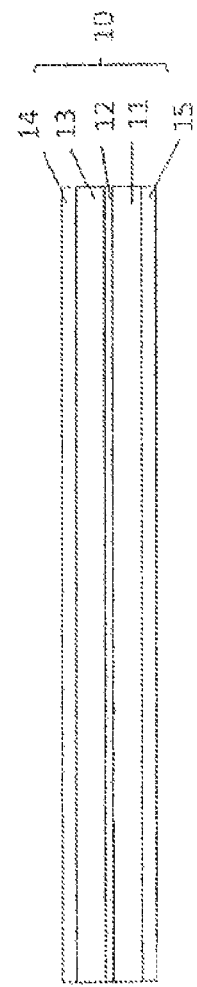
Figure 2C:
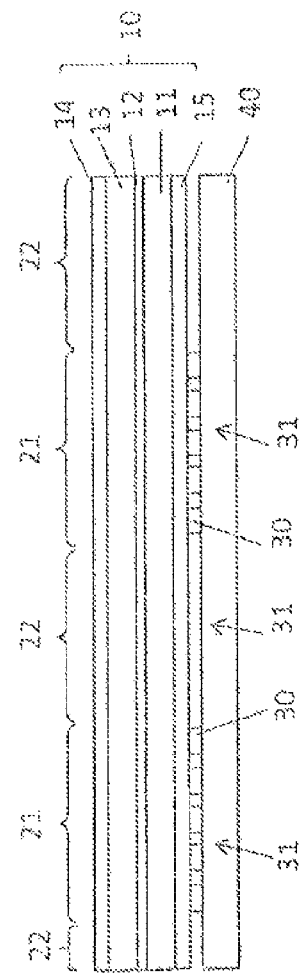

The production of the transfer film 1 is illustrated in steps in FIGS. 2 and 3. As FIG. 2A shows, the base film 10 is initially prepared without the adhesive layers 14 and 15, which are applied in the following method step. After an optional drying of the adhesive layers 14 and 15 has been carried out, the transfer film 40 is connected to the base film via the adhesive layer 30. The adhesive layer 30 can be applied to the transfer film 40 or to the adhesive layer 15. It is possible and preferred to apply the adhesive layer 30 only in the region 21.

Alternatively the adhesive layer 30 can also be applied over the whole surface and only activated in the region 21. A first region of the adhesive layer 30 activated by exposure. For this the film structure shown in FIG. 2C, consisting of the carrier film 40, the adhesive layer 30, the carrier film 11, the detachment layer 12 and the decorative ply 13, is exposed to UV light in the region 31. For this a collimated light source is used, which is on the side of the carrier film 40 facing away from the carrier film 11 and is spaced apart from the carrier film 40. Here an exposure mask, which masks the region 32 and thus makes a selective exposure of the region 31 possible, is arranged in the beam path between the light source and the adhesive layer 30. The exposure light source and the exposure mask are preferably part of a drum imagesetter, over which the film body is guided. The exposure mask here is formed and arranged such that the region 31 largely covers the first partial regions 21 and is positioned relative to the first partial regions 21 within the framework of a register tolerance of from preferably 0.1 mm to 2.0 mm.

In the region 32, the adhesive layer 30 is not exposed by UV light and is thus not activated.

The combination of an adhesive of the type shown in the above tables (deposition by means of flexographic printing with a grid density between 40% and 80% with 40 to 60 lines per cm) for the adhesive layer 30 and a heat-sealable adhesive, which has been deposited between 2 g/m$^2$ and 4 g/m$^2$, for the adhesive layer 15 has proved to be particularly successful. The UV adhesive is preferably purely radically UV-curing and therefore has a solids content of 100%. A monomer fraction can likewise evaporate during the UV curing, because heat is also introduced into the layer due to the UV radiation, if the adhesive is not completely enclosed between two neighboring layers, in particular films.

The heat-sealable adhesive consists of acrylates and solvent (isopropanol+toluene). The solids content is 19% to 20% in order to guarantee the deposition using the varnishing machine. At ambient temperature (approx. 20° C.) after drying it has a non-tacky surface, in particular at room temperature, as neither the melting point nor the glass transition temperature is below 30° C. and thus they are always above the processing (production) temperature of the film.

In a further step illustrated in FIG. 3, the decorative ply 13, the detachment layer 12 and the carrier film 11 are severed along the boundary lines defining the first partial regions 21 and separating the first partial regions 21 from the partial region 22. These layers are preferably severed by means of a punch, which introduces corresponding recesses into the film body consisting of the layers 30 as well as 15 to 11. Here it is also possible that the punch depth is selected such that the carrier film 40 is also partially severed. It is further also possible that the carrier film 11 is not completely, but only partially severed. This can on the one hand occur in such a way that regions in which the carrier film 11 is completely severed and is not severed alternate along the boundary line or that the carrier film 11 is not severed over its entire thickness, but only for example over 80% of its thickness.

In a further step shown in FIG. 3B, the part of the base film 10 (a "grating") comprising the partial region 22 is removed from the carrier film 40, wherein because of the adhesive layer 30 activated in the region 31 the base film remains adhering to the carrier film 40 in the first partial regions 21 and remains on the carrier film 40. After the "grating" has been removed, the multilayer body 1 shown in FIG. 3C, which can be used as a security element or as a transfer film for the application of a security element to a target substrate, thus results.

Figure 4:
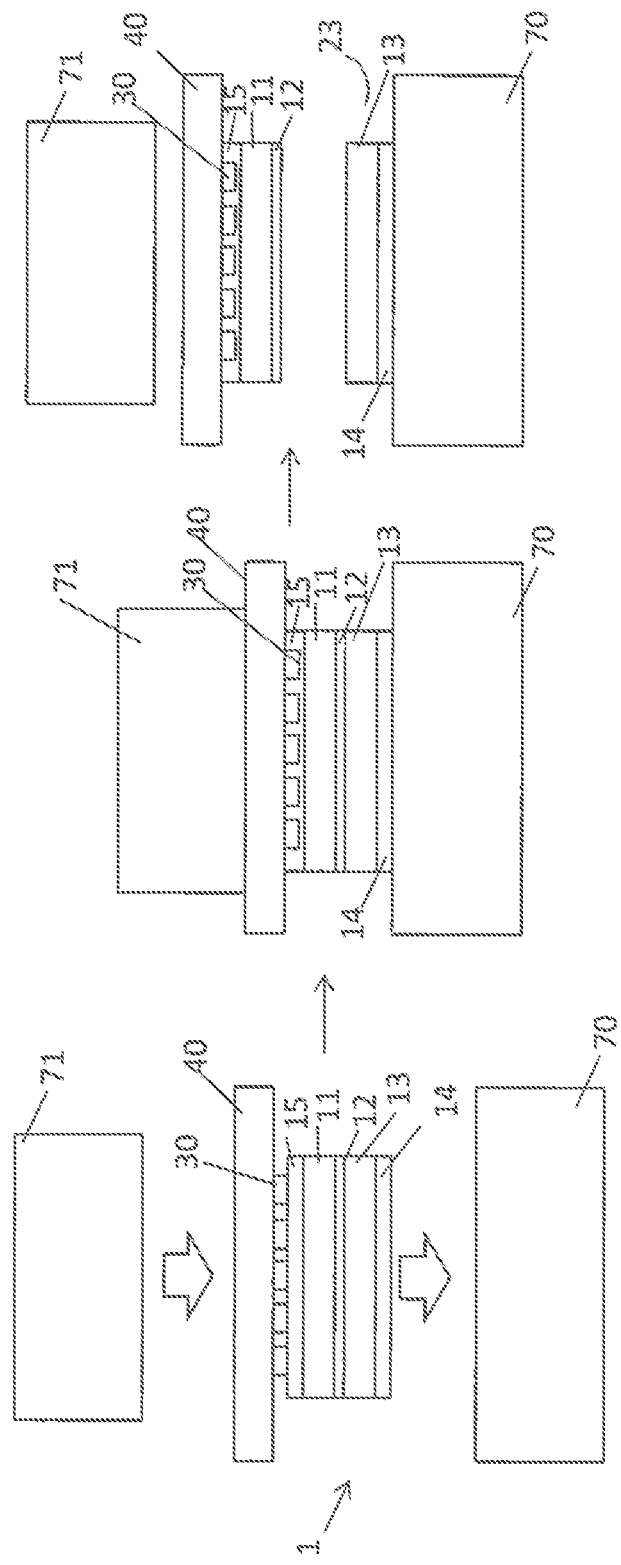
FIG. 4 schematic sectional representations to illustrate the method steps in the transfer of a transfer film.

As illustrated with the aid of FIG. 4, the multilayer body 1 can be used as a transfer film for the application of a security element 23 to a target substrate 70. For this the multilayer body 1 is placed on the target substrate 70, and the adhesive layers 14 and 15 are activated in a first partial region by a correspondingly shaped hot-stamping die 71. By the activation of the adhesive layer 14 the transfer ply of the multilayer body 1 is connected to the target substrate 70. At the same time an activation of the adhesive layer 15 is effected, by which the adhesion between the carrier plies 11 and 40 is increased, preferably by more than 50%, preferably more than 100%, particularly preferably more than 200%.

The stamping is effected at a temperature of from 80° C. to 300° C., preferably from 100° C. to 240° C., particularly preferably from 100° C. to 180° C. and/or with a stamping pressure of from 10 N/cm$^2$ to 10,000 N/cm$^2$, preferably from 100 N/cm$^2$ to 5000 N/cm$^2$ and/or with a stamping time of from 0.01 s to 2 s.

The multilayer body comprising the carrier film 40, the adhesive layer 30 and the carrier film 11 is then removed from the applied region of the decorative ply 13, with the result that the security element 23 remains on the target substrate 70, as is shown in FIG. 4. By the activation of the adhesive layer 15 it is ensured that no carrier film remains on the security element 23.

Alternative structures of the decorative ply 13 are illustrated in FIGS. 5 and 6. The further layers as well as the processing, however, correspond to the embodiment already described.

In the variant of the transfer film 1 according to FIG. 5, the decorative ply comprises an optional protective varnish layer 131 with a preferred layer thickness of from 0.1 μm to 20 μm, particularly preferably from 0.5 μm to 10 μm, a replication varnish layer with a preferred layer thickness of from 0.1 μm to 10 μm, particularly preferably from 0.5 μm to 5 μm with reflective layer 132, a primer varnish layer 133 with a preferred layer thickness of from 0.1 μm to 5 μm, particularly preferably from 1 μm to 3 v, a volume hologram layer 134 with a preferred layer thickness of from 5 μm to 50 μm, particularly preferably from 10 μm to 20 μm and a sealing varnish layer 135 with a preferred layer thickness of from 0.1 μm to 5 μm, particularly preferably from 5 μm to 15 μm. A volume hologram is inscribed into the volume hologram layer 134, which forms the essential security feature of the resulting security element 32.

In the variant according to FIG. 6, the decorative ply 13 consists of a print promoter layer 136 with a preferred layer thickness of from 1 μm to 30 μm, particularly preferably from 1 μm to 3 μm, to which an individualization feature can be applied by inkjet printing. This layer 136 can also be combined with all further layers of the decorative ply 13 already described in order thus to create an individualized security element 23.

A schematic sectional representation of a further transfer film 1 is shown in FIGS. 7A and 7B. As is shown in FIG. 7A, a detachment system 17 is provided on the second carrier film 40. The detachment system 17 makes it possible for the first carrier film 11 to remain on the security element 23 or in the layer composite thereof during the application of the security element 23.

By also applying the first carrier film 11 a self-supporting security element 23 can be produced, which can seal or cover for example apertures, in particular window openings, in the target substrate 70. The additional mechanical stability which the first carrier film 11 gives the security element 23 can furthermore serve to increase the optical brilliance of the security element 23 when the security element 23 is for example laminated into a plastic composite, as can be the case for example with security documents made of polycarbonate (PC) in an ID card format or other laminates. This additional mechanical stability can also be advantageous in the further processing of the target substrate 70, for example in the case of overprinting with die stamping. The arrow shown in FIG. 7A shows the position of the separation during application of the transfer film 1 to a target substrate 70. The base film 10 here is preferably formed as a laminating film.

The overall thickness of the detachment system 17 is preferably between 0.01 μm and 4 μm. The detachment system 17 preferably has a layer made of wax 171. The wax-like material is softened due to the heat arising during a hot-stamping procedure and makes a reliable separation of the second carrier film 40 possible.

As shown in FIGS. 7A and 7B, the detachment system 17 can furthermore have a layer made of a varnish 172. The varnishes 172 are preferably based on acrylates, polyurethanes or cellulose derivatives.

The varnish layer 172 preferably has a thickness in the range of from 0.1 to 3 µm, preferably in the range of from 0.2 to 1.5 µm.

Figure 8:
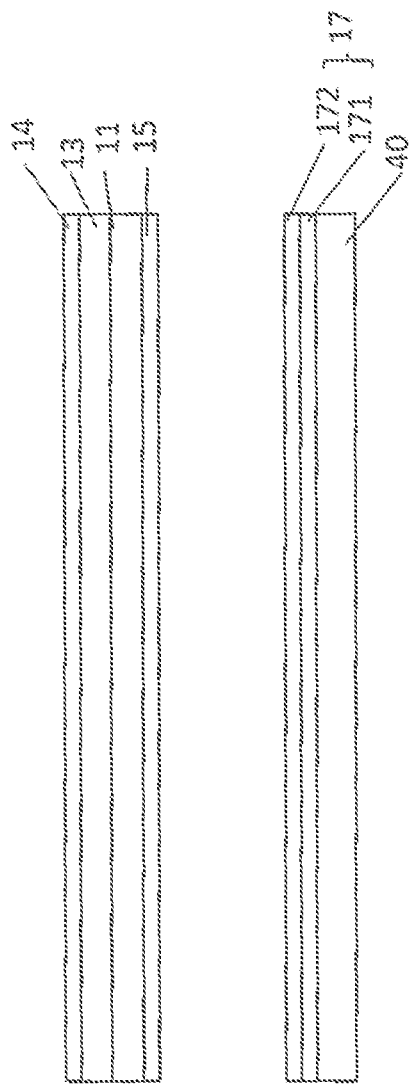

FIG. 8 shows a possible production of the transfer film 1. Here the detachment system 17, in particular consisting of a wax layer 171, which adjoins the second carrier film 40, and a varnish layer 172, is applied to the second carrier ply 40. The base film 10 preferably has the adhesive layer 14, the decorative ply 13 as well as the first carrier film 11 and the adhesive layer 15.

Figure 9:
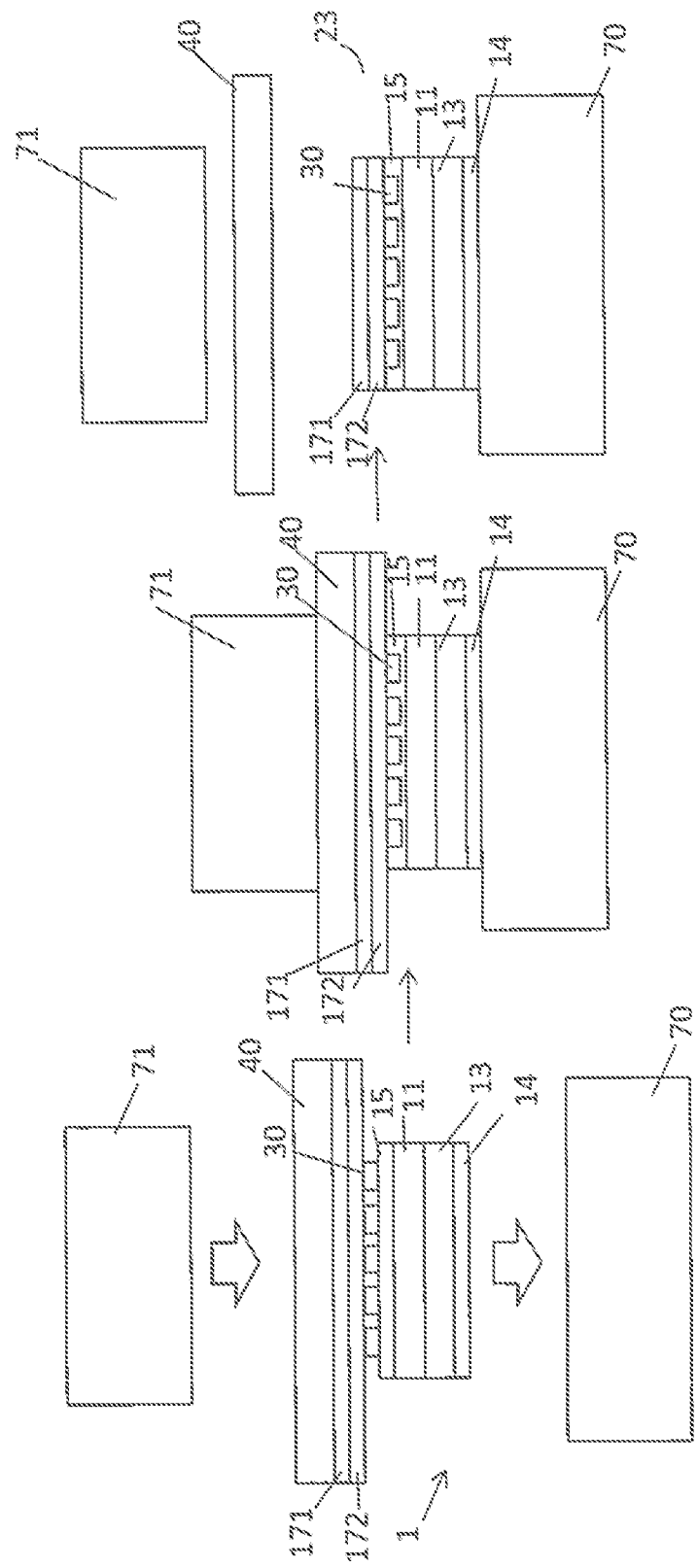

FIG. 9 shows the application, at least in regions, of the transfer film 1 to a target substrate 70. For this the transfer film 1 is placed on the target substrate 70 and the adhesive layers 14 and 15 are activated in a first partial region 21 by a correspondingly shaped hot-stamping die 71. By the activation of the adhesive layer 14 the transfer ply of the transfer film 1 is joined to the target substrate 70. At the same time an activation of the adhesive layer 15 is effected, by which the adhesion between the first carrier ply 11 and the detachment system 17 is increased. The wax layer 171 softening due to the action of heat during the application furthermore ensures a clean separation between the detachment system 17 and the second carrier film 40.

As shown in FIG. 9, the detachment system 17 remains on the target substrate 70 after application together with the first carrier film 11 and the decorative ply 13, preferably as a security element 23. Because the detachment system 17 forms the outer surface of the security element 23 and can be designed in various different ways, the security element can hereby be provided with additional functions. Examples are a better wettability or overprintability with further functional layers or, conversely, a hydrophobic function or functions to repel other liquids or also the generation of optical matting and/or of an optical gloss and/or the generation of particular tactile properties. It is also possible to add additional security prints in the visible wavelength range, UV range or IR range. Individual or all layers of the detachment layer system can be provided over the whole surface or only in partial surface regions.

Figures 10A, 10B:
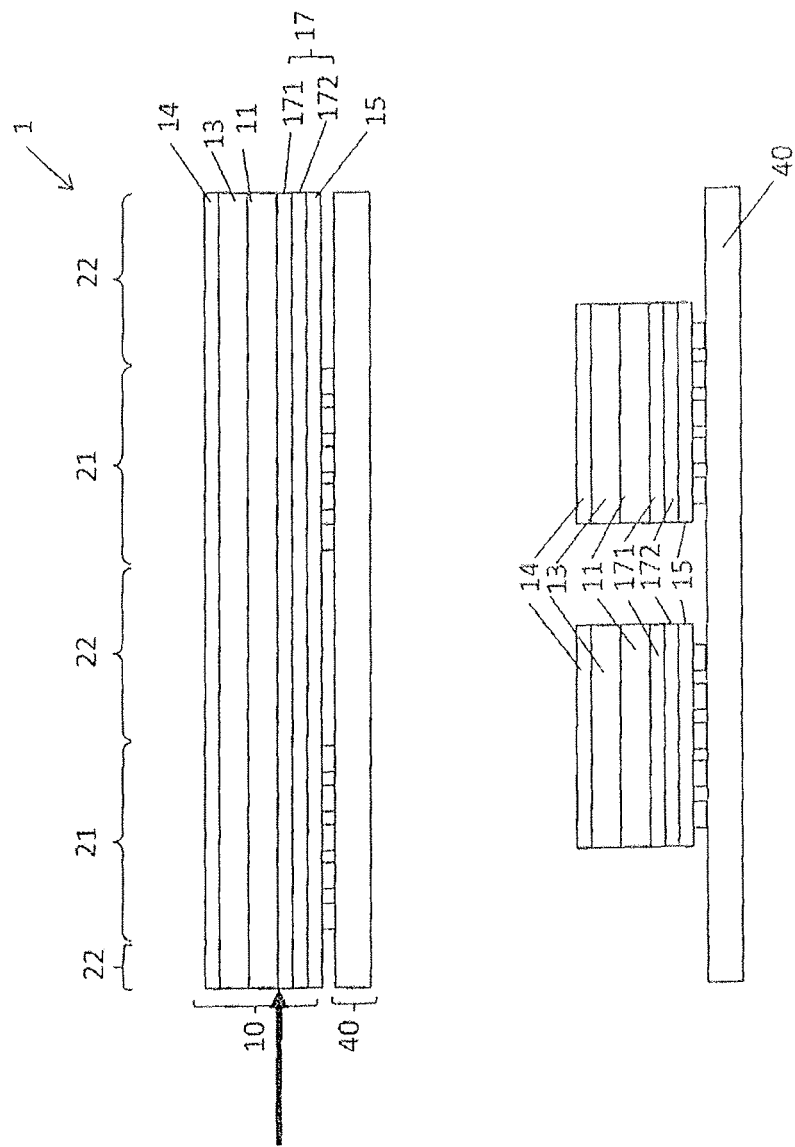

A schematic sectional representation of a further transfer film 1 is shown in FIGS. 10A and 10B. As is shown in FIG. 10A, a detachment system 17 is provided on the first carrier film 11. The detachment system 17 makes it possible for the first carrier film 11 to remain on the security element 23 or in the layer composite thereof during the application of the security element 23.

A self-supporting security element 23 can hereby be produced, which can seal or cover for example apertures, in particular window openings, in the target substrate 70. The additional mechanical stability which the first carrier film 11 gives the security element 23 can furthermore serve to increase the optical brilliance of the security element 23 when the security element 23 is for example laminated into a plastic composite, as can be the case for example with security documents made of polycarbonate (PC) in an ID card format or other laminates. This additional mechanical stability can also be advantageous in the further processing of the target substrate 70, for example in the case of overprinting with die stamping.

The arrow shown in FIG. 10A shows the position of the separation during application of the transfer film 1 to a target substrate 70. The base film 10 here is preferably formed as a laminating film.

The overall thickness of the detachment system 17 is preferably between 0.01 µm and 4 µm. The detachment system 17 preferably has a layer made of wax 171. The wax-like material is softened due to the heat arising during a hot-stamping procedure and makes a reliable separation of the second carrier film 40 possible.

As shown in FIGS. 10A and 10B, the detachment system 17 can furthermore have a layer made of a varnish 172. The varnish 172 is preferably based on acrylates, polyurethanes or cellulose derivatives.

The varnish layer 172 preferably has a thickness in the range of from 0.1 to 3 µm, preferably in the range of from 0.2 to 1.5 µm.

Figure 11:
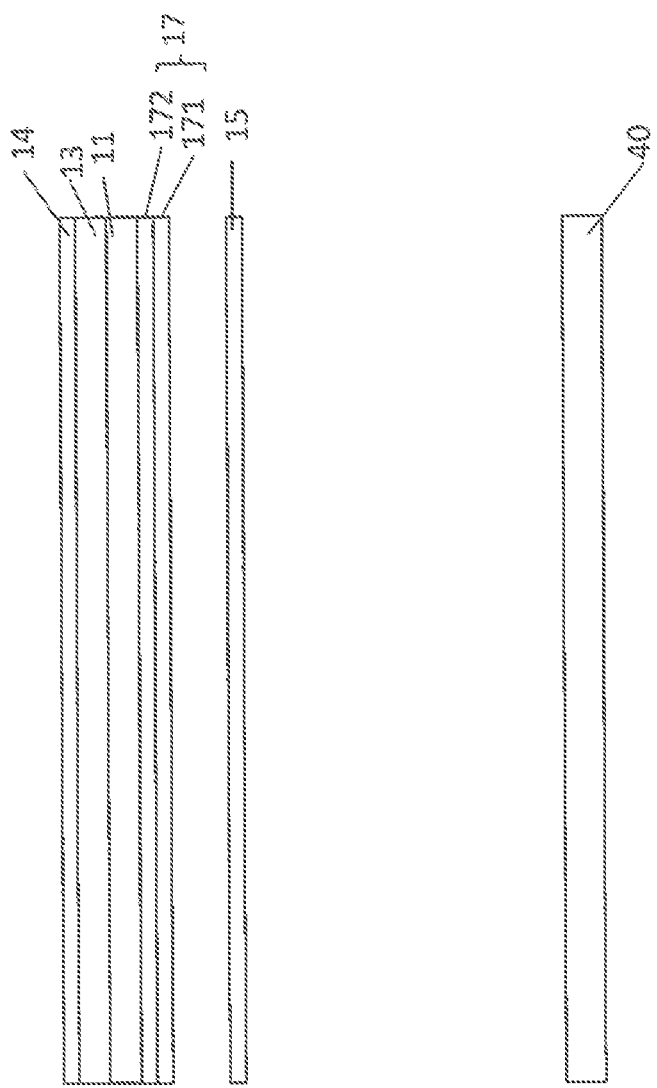

FIG. 11 shows a possible production of the transfer film 1. Here the detachment system 17 is applied to the side of the first carrier film 11 of the base film 10 facing away from the decorative ply 13. The detachment system 17 can have a wax layer 171 and a varnish layer 172. Furthermore, the adhesive layer 15 is then preferably applied to the outer, free side of the detachment system 17. In the further processing, the adhesive layer 15 is preferably in contact with the adhesive layer 30. This embodiment variant can also make it possible for the base film 10 to remain on the security element 23 or in the layer composite thereof during the application of the security element 23. A self-supporting security element 23 can thereby be produced, which can seal or cover for example apertures, in particular window openings, in the target substrate.

It is also conceivable that, before the detachment system 17 is applied, one or more auxiliary layers (not shown) are applied to the side of the first carrier film 11 of the base film 10 facing away from the decorative ply 13 and are then therefore arranged between the first carrier film 11 and the detachment system 17. It is hereby possible with the aid of these auxiliary layers to provide the outer surface of the security element 23 with additional functions. Examples are better wettability or overprintability with further functional layers or, conversely, a hydrophobic function or functions to repel other liquids or also the generation of optical matting and/or of an optical gloss and/or the generation of particular tactile properties. It is also possible to add additional security prints in the visible wavelength range, UV range or IR range. A further function can consist of increasing the adhesive bond to further cover plies when the target substrate 70 is laminated into a document or a document composite. Individual or all layers of the detachment layer system can be provided over the whole surface or only in partial surface regions.

Figure 12:
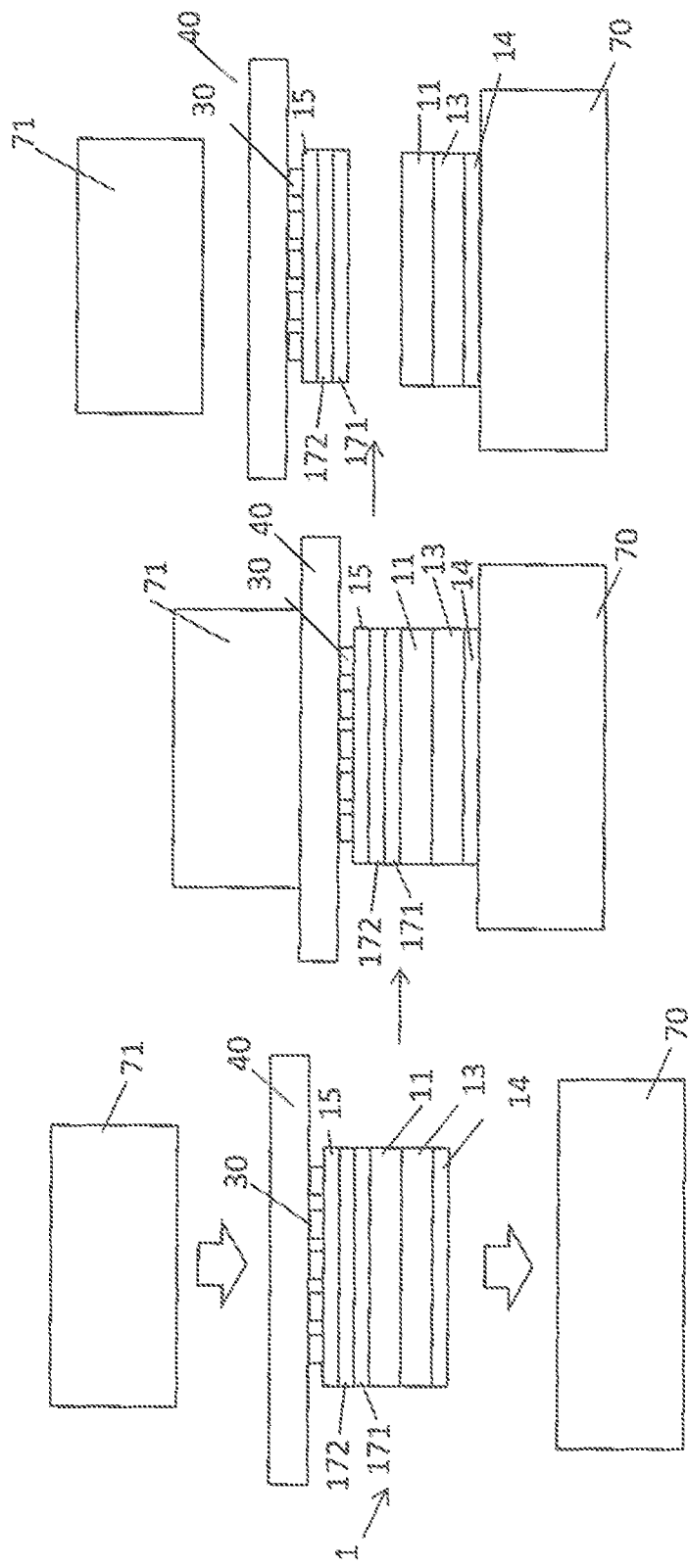

FIG. 12 shows the application, at least in regions, of the transfer film 1 to a target substrate 70. For this the transfer film 1 is placed on the target substrate 70. By the activation of the adhesive layer 14 the transfer ply of the transfer film 1 is joined to the target substrate 70. The wax layer 171 softening due to the action of heat during the application ensures a clean separation between the detachment system 17 and the first carrier film 11.

As shown in FIG. 12, the detachment system 17 is detached from the security element 23 after application to the target substrate 70. If auxiliary layers are arranged between the detachment system 17 and the first carrier film 11, the auxiliary layers form the outer, free surface of the security element 23. If these auxiliary layers are dispensed with, the carrier film 11 forms the outer, free surface of the security element 23 and thus enables a particularly brilliant optical effect of the security element 23.

LIST OF REFERENCE NUMBERS 1 transfer film
10 base film
11 carrier film (of the base film)
12 detachment layer (of the base film)
13 decorative ply (of the base film)
131 protective varnish layer (of the base film)
132 replication varnish layer (of the base film)
133 primer varnish layer (of the base film)
134 volume hologram layer (of the base film)
135 sealing varnish layer (of the base film)
136 print promoter layer (of the base film)
14 adhesive layer (of the base film)
15 adhesive layer (of the base film)
16 reflective layer (of the base film)
17 detachment system
171 wax layer
172 varnish layer
21 first partial region
22 second partial region
23 security element
30 adhesive layer
31 region
32 region
40 second carrier film
70 target substrate
71 hot-stamping die

The invention claimed is:

1. A transfer film for the transfer of one or more multilayer bodies onto a target substrate, wherein the transfer film has a base film, which has a first carrier film and a single- or multilayered decorative ply, the first carrier film having a surface facing the decorative ply and an opposite surface facing away from the decorative ply,
  wherein the transfer film further has a second carrier film with a first adhesive layer and a second adhesive layer applied to the opposite surface of the first carrier film, wherein the first adhesive layer and the second adhesive layer are arranged between the first carrier film and the second carrier film, and
  wherein the first adhesive layer is activated in a first region at least partially covering at least one first partial region of the base film, with the result that the base film adheres to the second carrier film in the at least one first partial region, and
  wherein the first adhesive layer is not activated, not provided, only partially provided or deactivated in a second region adjoining the first region, whereby the first adhesive layer is not activated, not provided, only partially provided or deactivated in a second partial region of the base film adjoining the at least one first partial region, and
  wherein the first carrier film is severed along a boundary line defining the at least one first partial region and separating the at least one first partial region from the second partial region of the base film and a part of the base film comprising the second partial region is removed from the second carrier film.

2. The transfer film according to claim 1, wherein the base film comprises a detachment layer arranged between the first carrier film and the decorative ply, which makes it possible to separate the decorative ply from the first carrier film.

3. The transfer film according to claim 1, wherein the base film has a detachment system arranged between the first carrier film and the second carrier film, which makes it possible to separate the base film from the second carrier film.

4. The transfer film according to claim 3, wherein the detachment system has a thickness between 0.01 µm and 4 µm.

5. The transfer film according to claim 3, wherein the detachment system has a wax material.

6. The transfer film according to claim 3, wherein the detachment system is formed multilayered, wherein the detachment system comprises a layer made of wax and a layer made of a varnish.

7. The transfer film according to claim 6, wherein acrylates, polyurethanes or cellulose derivatives are used as varnish.

8. The transfer film according to claim 6, wherein the layer made of varnish has a thickness between 0. µm and 3 µm.

9. The transfer film according to claim 1, wherein the decorative ply has a surface facing away from the first carrier film and the transfer film has a third adhesive layer applied to the decorative ply on the surface facing away from the first carrier film, and wherein an adhesive strength produced by the second adhesive layer between the first carrier film and the second carrier film is lower than an adhesive strength produced between the decorative ply and the target substrate by the activated third adhesive layer.

10. The transfer film according to claim 1, wherein the second carrier film is a plastic film with a thickness of more than 6 µm.

11. The transfer film according to claim 1, wherein the first carrier film is a plastic film with a thickness of more than 4 µm.

12. The transfer film according to claim 1, wherein two or more first partial regions are provided and each of these first partial regions is surrounded by the second partial region formed as a coherent region.

13. The transfer film according to claim 1, wherein the first region covers at least 50% of each of the at least one first partial region.

14. The transfer film according to claim 1, wherein the first region completely covers each of the at least one first partial region.

15. The transfer film according to claim 1, wherein the second partial region covers the first region by less than 5%.

16. The transfer film according to claim 1, wherein the decorative ply has the one or more layers generating an optically variable effect.

17. The transfer film according to claim 16, wherein the decorative ply has a replication varnish layer with a surface structure molded into the replication varnish layer, the surface structure comprising at least one of a diffractive surface structure, lens structure, matte structure and blazed grating.

18. The transfer film according to claim 16, wherein the decorative ply has a reflective layer formed patterned in the form of a first item of information.

19. The transfer film according to claim 16, wherein the decorative ply has a thin-film layer element for generating a color shift effect dependent on a viewing angle.

20. The transfer film according to claim 16, wherein the decorative ply has a color layer formed patterned in the form of a second item of information.

21. The transfer film according to claim 16, wherein the decorative ply has a volume hologram.

22. The transfer film according to claim 1, wherein the base film is a hot-stamping film.

23. The transfer film according to claim 1, wherein the base film is a laminating film.

\* \* \* \* \*